(12) United States Patent
Hultberg

(10) Patent No.: US 8,540,382 B1
(45) Date of Patent: Sep. 24, 2013

(54) SPHERICAL MECHANICAL LINKAGE AND MULTI-AXIS TRACKERS

(76) Inventor: Donald E. Hultberg, Seattle, WA (US)

( * ) Notice: Subject to any disclaimer, the term of this patent is extended or adjusted under 35 U.S.C. 154(b) by 0 days.

(21) Appl. No.: 13/536,932

(22) Filed: Jun. 28, 2012

(51) Int. Cl.
G02B 5/08 (2006.01)

(52) U.S. Cl.
USPC ........................................................ 359/838

(58) Field of Classification Search
USPC ........................... 359/838, 871, 872, 875, 879
See application file for complete search history.

(56) References Cited

U.S. PATENT DOCUMENTS

| 125,030 | A | | 3/1872 | Dille |
|---|---|---|---|---|
| 2,599,381 | A | | 6/1952 | Gerks |
| RE25,242 | E | | 9/1962 | Toulmin |
| 4,028,813 | A | | 6/1977 | Eldridge |
| 4,139,286 | A | | 2/1979 | Hein et al. |
| 4,202,321 | A | | 5/1980 | Volna |
| 4,266,179 | A | | 5/1981 | Hamm, Jr. |
| 4,295,621 | A | | 10/1981 | Siryj |
| 4,368,962 | A | * | 1/1983 | Hultberg ........................ 126/605 |
| 4,419,981 | A | * | 12/1983 | Mori ............................. 126/575 |
| 4,546,756 | A | | 10/1985 | Leroy et al. |
| 5,184,333 | A | | 2/1993 | Caspar |
| 5,966,991 | A | | 10/1999 | Gosselin et al. |
| 6,355,048 | B1 | | 3/2002 | Hong et al. |
| 6,826,122 | B2 | | 11/2004 | Zaugg |
| 6,827,445 | B2 | | 12/2004 | Abe et al. |
| 6,899,096 | B2 | | 5/2005 | Nakamura |
| 7,372,781 | B2 | | 5/2008 | Loth |
| 7,430,077 | B2 | | 9/2008 | Briee et al. |
| 7,442,126 | B2 | | 10/2008 | Thompson |
| 7,793,654 | B1 | | 9/2010 | Thorne |
| 7,813,041 | B2 | | 10/2010 | Briee et al. |
| 8,069,849 | B2 | | 12/2011 | Matalon |

FOREIGN PATENT DOCUMENTS

CH           689359 A5      3/1999

OTHER PUBLICATIONS

Johnson, Red Rock Energy: Solar Power Heliostat Arrays, http://www.redrok.com/main.htm (retrieved Nov. 14, 2011).

* cited by examiner

Primary Examiner — Euncha Cherry
(74) Attorney, Agent, or Firm — Knobbe, Martens, Olson & Bear, LLP

(57) ABSTRACT

Spherical mechanical linkages may include a yoke defining a first axis and a second axis, a crank rotatably coupled to the yoke about the first axis; a deflecting member that defines a plane and that is coupled to the crank along a third axis, and a rocking frame slideably coupled to the yoke in the plane defined by the deflecting member and rotatably coupled to the yoke about the second axis. One or more components of the spherical mechanical linkage may be symmetric about an axis. A payload, such as a mirror or a camera, can be mounted on the linkage as part of a multi-axis tracker.

21 Claims, 12 Drawing Sheets

SPHERICAL MECHANICAL LINKAGE AND MULTI-AXIS TRACKERS

BACKGROUND

Mechanical linkages include components coupled to one another that may transmit movement or force in one or more directions. Various mechanical linkages may convert linear motion to linear motion, rotational motion to rotational motion, rotational motion to linear motion (and its reverse), linear (or rotational) motion to oscillatory motion or sliding motion, and so on. Mechanical linkages have many uses, such as in mechanical systems, automotive systems, aerospace systems, robotics, prosthetics, biomedical devices, solar tracking, photography, cinematography, and others.

Spherical mechanical linkages are a type of mechanical linkage wherein the components have axes of movement that intersect at the center of a sphere. Current spherical mechanical linkages have a number of drawbacks. One drawback of current spherical mechanical linkages is that the components may interfere with the placement of long, wide, or otherwise irregularly-shaped payloads. Examples of such payloads include tubes, telescopes, guns, or other long or wide devices. Another drawback of current spherical mechanical linkages is that without counterweights, they may become unbalanced if holding a payload, even a compact payload.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Illustrative Spherical Mechanical Linkage

Figure 1:
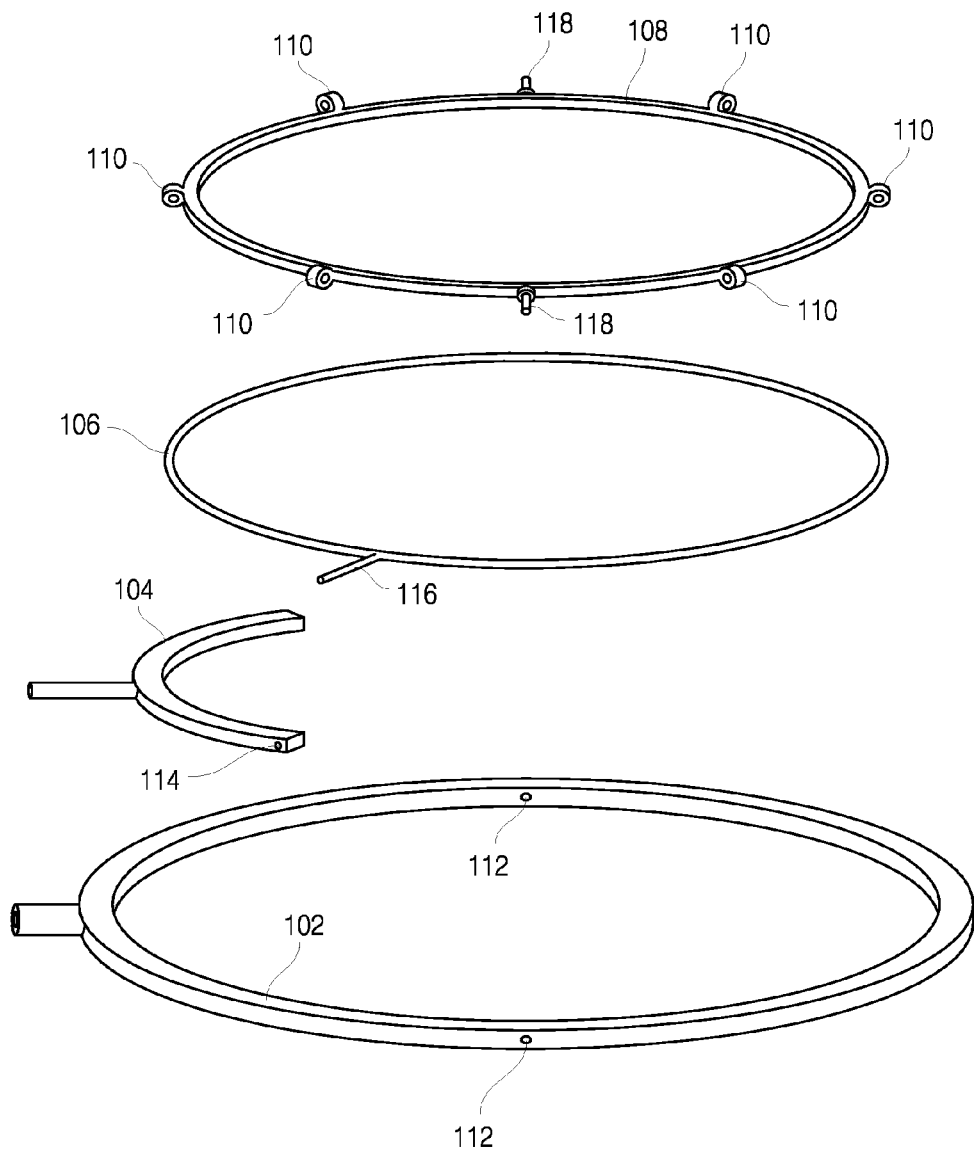
FIG. 1 depicts an exploded view of several components that may be included in various embodiments of spherical mechanical linkages.

FIG. 1 displays an exploded view of embodiments of the components of an embodiment of a spherical mechanical linkage. This embodiment includes a yoke 102, a crank 104, a deflecting member 106, and a rocking frame 108. Other embodiments of spherical mechanical linkages may include variations on the yoke 102, the crank 104, the deflecting member 106, or the rocking frame 108. A number of these component variations are discussed below.

In various embodiments, the yoke 102 is a complete annulus or ring, or a section of an annulus or ring. Other geometric configurations for the yoke 102 may be employed as desired. For example, the yoke 102 may include one or more linear segments, one or more curved segments, or both linear and curved segments. The yoke 102 may also include a hollow cylindrical section or hollow polygonal section. The yoke 102 may also include opposing yoke bearing points 112 as also illustrated in FIG. 1. In some embodiments, the yoke bearing points 112 include bearings.

In various embodiments, the crank 104 may include one or more linear segments, one or more curved segments, or both linear and curved segments. In some embodiments, the crank 104 has symmetry about an axis. This symmetry may be bilateral or rotational symmetry. Other geometric configurations for the crank 104 may be employed as desired. For example, the crank 104 may include a conic section, such as a conical frustum. The crank 104 may also include a crank bearing point 114 as also illustrated in FIG. 1.

In various embodiments, the deflecting member 106 is a complete annulus or ring, or a section of an annulus or ring. Other geometric configurations for the deflecting member 106 may be employed as desired. For example, the deflecting member 106 may include one or more linear segments, one or more curved segments, or both linear and curved segments. The deflecting member 106 may have a polygonal shape. The cross-section of the deflecting member 106 may be varied as well. For example, the cross-section may be a circle, square, triangle, cruciform, or other shape. The deflecting member 106 may also include a stub shaft 116 which may be rotationally coupled to the crank 104 at the crank bearing point 114 as is illustrated in FIGS. 1 and 2.

In various embodiments, the rocking frame 108 is a complete annulus or ring, or a section of an annulus or ring. Other geometric configurations for the rocking frame 108 may be employed as desired. For example, the rocking frame 108 may include one or more linear segments, one or more curved segments, or both linear and curved segments. The rocking frame may have a polygonal shape. Still other geometric shapes are possible for the rocking frame. Additionally, the rocking frame 108 and the deflecting member 106 may have the same shape, or different shapes. The rocking frame 108 may include several bearing points 110 as depicted in FIG. 1 so that the rocking frame 108 may be slideably coupled to the deflecting member 106 as depicted in FIG. 2. It will be appreciated that in other embodiments, any number of bearing points 110 may be provided on the rocking frame 108 to enable slideable coupling with the deflecting member 106. In another embodiment, and as further depicted in FIG. 1, the rocking frame 108 may also include stub shafts 118 so that the rocking frame 108 may be rotatably coupled to the yoke 102 at yoke bearing points 112, as also shown in FIG. 2. In still another embodiment, the rocking frame 108 may include one or more hollow segments to permit the deflecting member 106 to pass therethrough.

Figure 2:
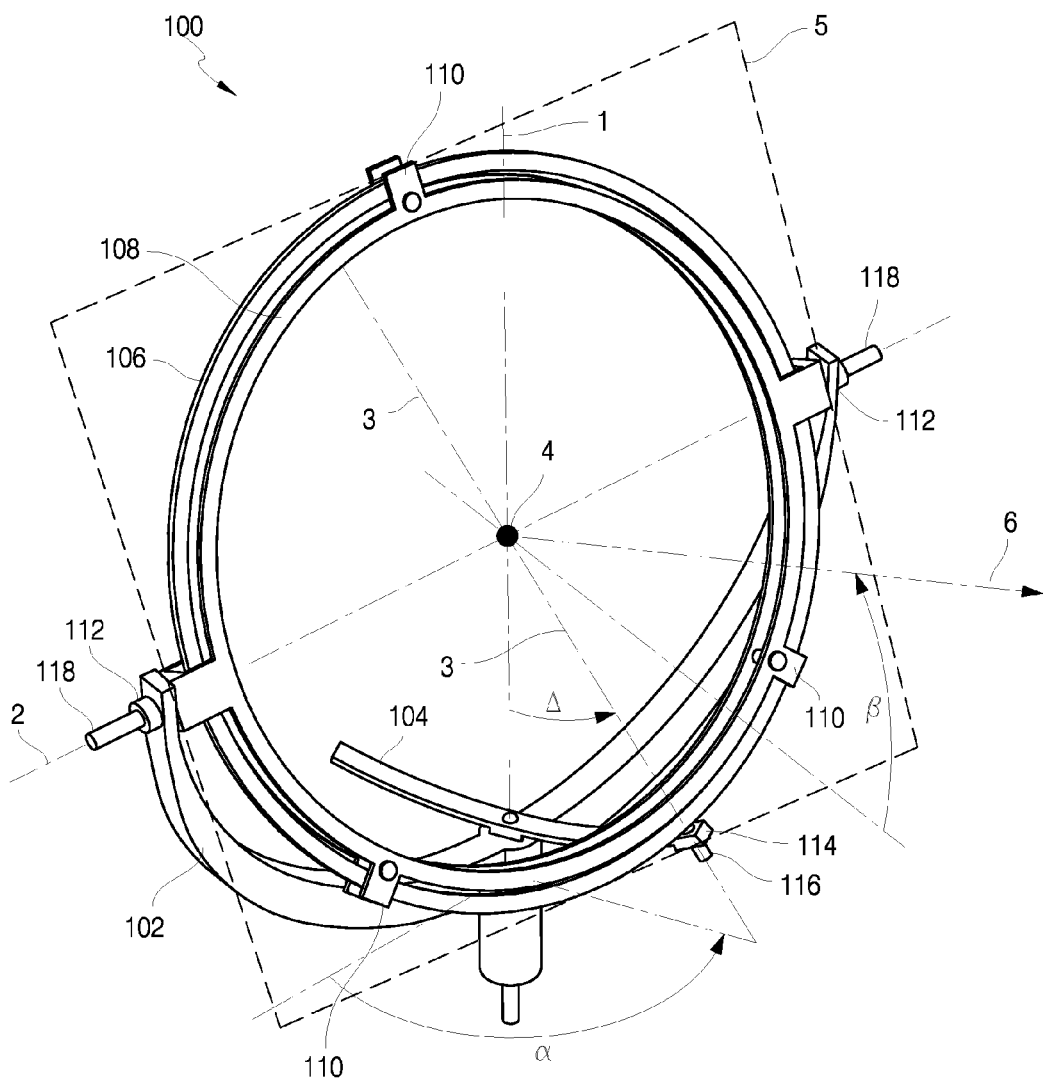
FIG. 2 depicts an environmental view of an embodiment of a spherical mechanical linkage.

FIG. 2 depicts an embodiment of an assembled spherical mechanical linkage 100 to explain the relationships between the various spherical mechanical linkage components as described above. The yoke 102, here an embodiment with a semi-annular shape, defines a first axis 1 and a second axis 2. More specifically, in one embodiment, the second axis 2 is defined by an imaginary line passing through the opposing yoke bearing points 112, while the first axis 1 is perpendicular to the second axis 2 and located in the same plane as the yoke 102. The yoke 102 and the crank 104 are rotatably coupled about the first axis 1. The rocking frame 108 is rotatably coupled via stub shafts 118 to the yoke 102 at yoke bearing points 112 so that the rocking frame 108 may rotate or oscillate about the second axis 2. The crank 104 is connected to the deflecting member 106 about a third axis 3 via the stub shaft 116 at crank bearing point 114. The third axis 3 is deflected from the first axis 1 at an angle Δ. The angle Δ may be selected by varying the position of stub shaft 116 and crank bearing point 114. In some embodiments, the angle Δ is between about 0° and 90°. In some embodiments, the angle Δ is between about 23° and 24°. In other embodiments, the angle Δ is between about 23.4° and 23.5°. The deflecting member 106 is in turn slideably coupled to rocking frame 108 along the bearing points 110. The deflecting member 106 and the rocking frame 108 are positioned such that they occupy the same imaginary plane 5. The first axis 1, the second axis 2, and the third axis 3 intersect at intersection point 4 in the imaginary plane 5. A payload axis 6 is defined by a vector normal to the imaginary plane 5 at the intersection point 4. The payload axis 6 is deflected at an angle β from a plane that is normal to the first axis 1 that also passes through second axis 2.

As discussed above, many variations of the components of the spherical mechanical linkage 100 are possible. It should be appreciated that in the embodiment illustrated in FIG. 2, the embodiments of the yoke 102, the crank 104, the deflecting member 106, and the rocking frame 108 included in the embodiment of the spherical mechanical linkage 100 are all substantially symmetric with respect to the first axis 1. This embodiment is advantageous in that the spherical mechanical linkage 100 is balanced with respect to the first axis 1. Accordingly, a payload mounted to the spherical linkage will not unbalance the spherical mechanical linkage 100 if the payload's center of mass is located along the first axis 1. It should also be appreciated that in this embodiment, the deflecting member 106 and the rocking frame 108 advantageously define a relatively open space, permitting the placement of long or otherwise irregularly shaped payloads therethrough.

The entire spherical mechanical linkage 100 may be rotated about the first axis 1 by rotating the yoke 102 about the first axis 1. The crank 104 may also be rotated about the first axis 1 independently of the rotation of the yoke 102. As the crank 104 rotates about the first axis 1, the crank 104 displaces the deflecting member 106. As the deflecting member 106 is displaced by the crank 104, it drags the rocking frame 108 with it, causing the rocking frame 108 to rock back and forth about the second axis 2. Simple trigonometry shows the relationship between a rotation angle α of the crank 104, the deflection angle β of the payload axis 6, and the fixed angle Δ of the third axis 3 with respect to the first axis 1:

$$\tan \beta = \tan \Delta \cdot \sin \alpha$$

Thus, the imaginary plane 5 and the payload axis 6 may be positioned in any desired direction by rotating the yoke 102 and/or the crank 104.

Figure 3A:
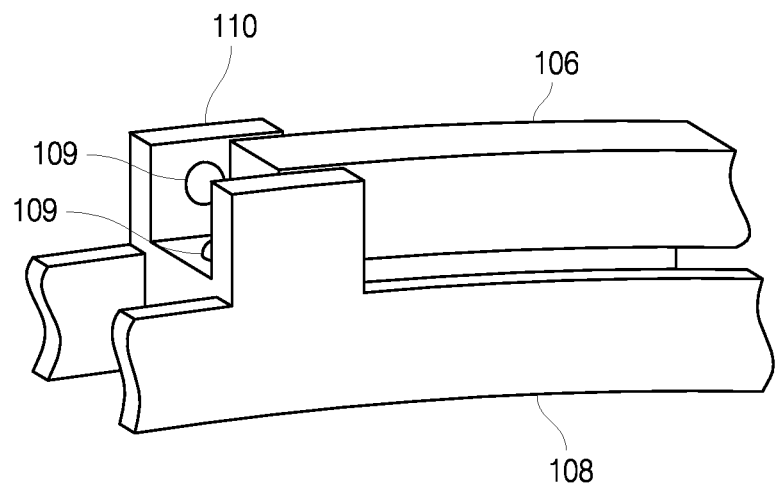
FIGS. 3A and 3B depict embodiments of bearings that may be included in various embodiments of spherical mechanical linkages.
Figure 3B:
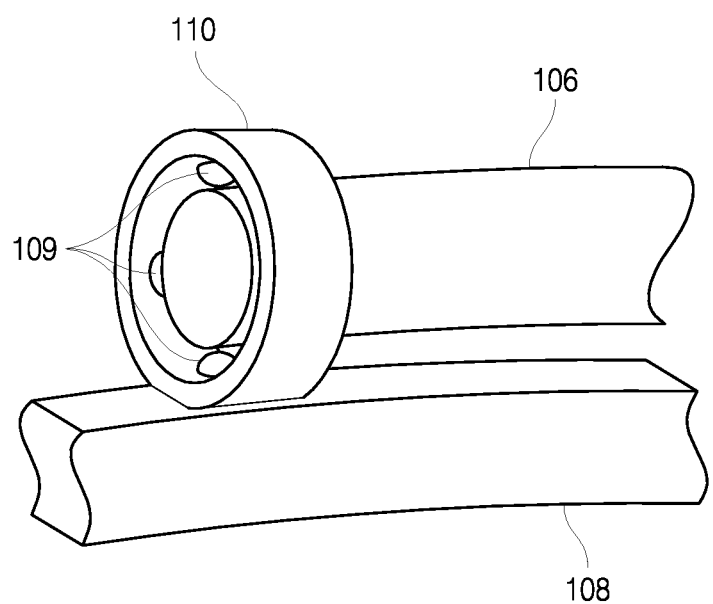

FIGS. 3A and 3B depict one embodiment of the bearing points 110 that may be included on the rocking frame 108. As discussed above with reference to FIGS. 1 and 2, the deflecting member 106 and the rocking frame 108 are slideably coupled to one another along the bearing points 110. The shape of each of the bearing points 110 may be varied as desired, such as to be compatible with the cross-sectional shape of the deflecting member 106. For example, in FIG. 3A, the cross-sectional shape of the deflecting member 106 is a square, and in FIG. 3B, the cross-sectional shape of the deflecting member is a circle. Thus, in FIG. 3A, the shape of the depicted bearing point 110 is compatible with the square cross-sectional shape of the deflecting member 106, while the shape of the bearing points 110 shown in FIG. 3B is circular so as to be compatible with the circular cross-sectional shape of the deflecting member 106.

Each of the bearing points 110 may contain one or more bearings 109 that contact one or more surfaces of the deflecting member 106 as the deflecting member slides back and forth in the rocking frame 108. In some embodiments, a bearing point 110 may include enough bearings 109 so that each surface of the deflecting member 106 is contacted by a bearing 109. For example, for a deflecting member 106 with a triangle cross section, three bearings 109 may be used, one for each cross-section surface of the deflecting member 106. In some embodiments, a bearing point 110 may have a number of bearings 109 such that fewer than all surfaces of the deflecting member 106 are contacted by a bearing 109. For instance, in FIG. 3A, a deflecting member 106 with a four-sided rectangular cross-section is contacted on three sides by bearings 109.

In some embodiments, the bearings 109 include cylindrical or roller bearing elements. In other embodiments, the bearings 109 include ball bearings. In addition, each of the bearing points 110 on the rocking frame 108 may have the same number of bearings 109, or one or more bearing points 110 may have a different number of bearings 109.

Illustrative Basic Multi-Axis Tracking System

Figure 4:
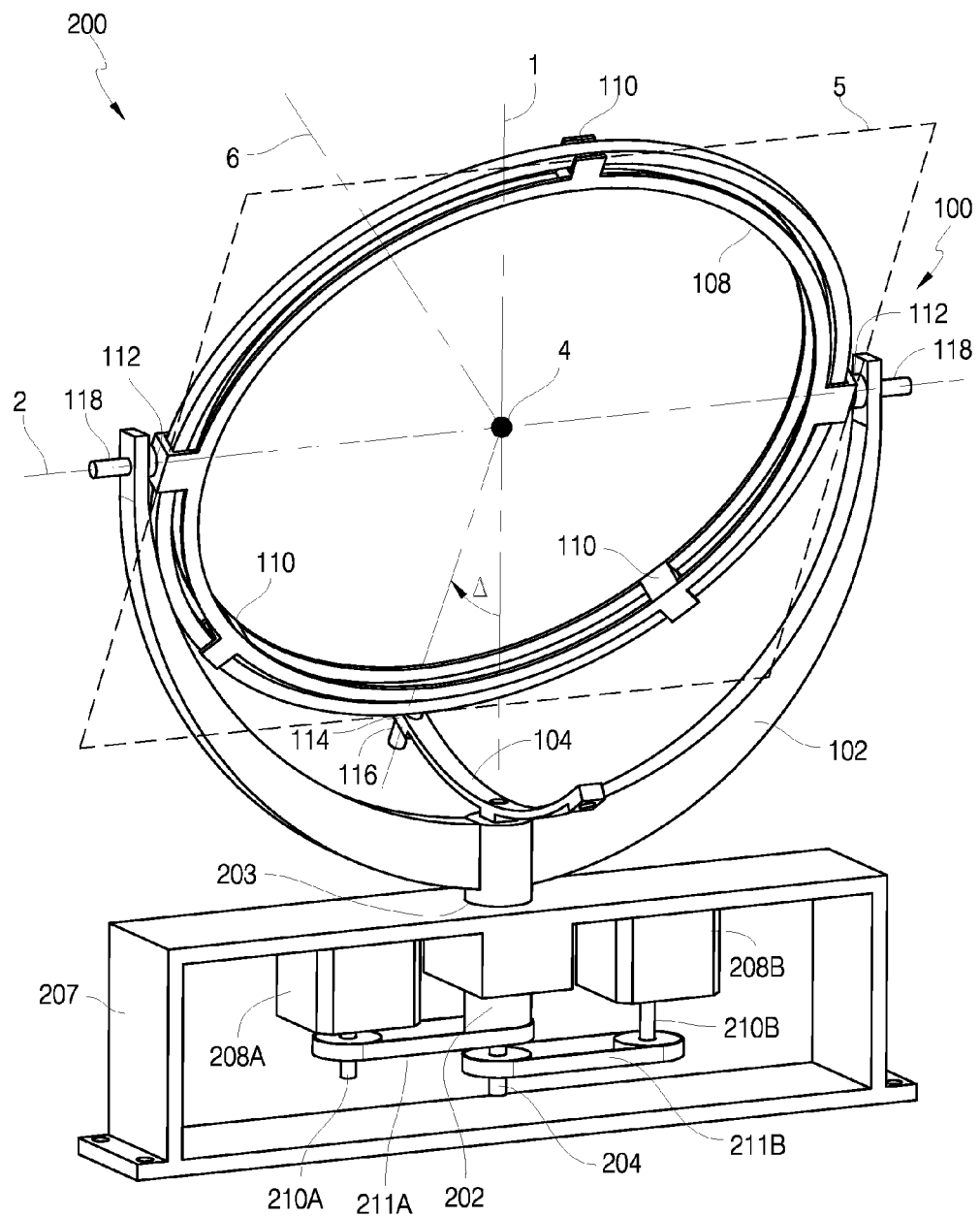
FIG. 4 depicts an environmental view of an embodiment of a multi-axis tracking system that incorporates a spherical mechanical linkage.

FIG. 4 depicts an embodiment of a multi-axis tracking system 200 that includes the embodiment of a spherical mechanical linkage 100 shown in FIG. 2 mounted on a base 207. The spherical mechanical linkage 100 may be mounted or affixed to the base 207 at any desired angle. The yoke 102 may be mechanically coupled to a yoke drive shaft 202. The crank 104 may be mechanically coupled to a crank drive shaft 204. The yoke drive shaft 202 and crank drive shaft 204 may be concentric with each other about first axis 1, with the crank drive shaft 204 located inside the yoke drive shaft 202. The yoke drive shaft 202 and the crank drive shaft 204 may be coupled through a base 207 by means of a base bearing 203. It will be appreciated that in some embodiments, the yoke drive shaft 202 may include one integral component that rotates at one rate, or may include multiple segments which may rotate at the same or different rates.

The base 207 may house one or more means for driving the yoke 102, the crank 104, or both about an axis, such as first axis 1. In the embodiment shown, a yoke motor 208A drives the yoke 102 and a crank motor 208B drives the crank 104. The rotational motion generated by the motors 208A and 208B through their respective motor shafts 209A and 209B may be transmitted by means of belts 211A and 211B. The belt 211A transmits the rotational motion of the yoke motor shaft 209A to the yoke drive shaft 202 and to the yoke 102. The belt 211B transmits the rotational motion of the crank motor shaft 209B to the crank drive shaft 204 and to the crank 104. In further embodiments, the rotational motion produced by one or more motors is transmitted through one or more gear trains coupled to one or more drive shafts. It should be appreciated that other structures for producing and transmitting motion are possible. For example, the rotational motion produced by one or more motors may be transmitted by means of tracks, sprockets, chains, or even other mechanical linkages. In other embodiments, the structures for producing and transmitting motion are housed partially or entirely outside the base 207.

The components of the multi-axis tracking system 200, as with the components of the spherical mechanical linkage 100, may have many variations. For example, one motor may drive the yoke drive shaft 202 and another motor may drive the crank drive shaft 204, as shown in FIG. 4. In other embodiments, multiple motors may separately drive yoke drive shaft 202 and crank drive shaft 204. These motors may be employed in a vertical cylinder formation, wherein one or more motors are hollow to permit the passage of yoke drive shaft 202 and/or crank drive shaft 204 therethrough.

Those skilled in the art will appreciate that motor 208 may drive multiple multi-axis tracking systems, for example by driving multiple yoke drive shafts 202 and/or multiple crank drive shafts 204. It should also be appreciated that in some embodiments, motors are not used. The yoke drive shaft 202 and the crank drive shaft 204 may be driven by any structure capable of producing rotational motion, such as a water wheel or manual power.

Although the multi-axis tracking system discussed above incorporates a concentric yoke drive shaft 202 and crank drive shaft 204, it should be appreciated that yoke drive shaft 202 and crank drive shaft 204 need not be concentric. For example, the yoke drive shaft 202 may be positioned along the first axis 1 at the opposite end of the yoke 102 from crank 104 and crank drive shaft 204. Moreover, in embodiments where the yoke drive shaft 202 and the crank drive shaft 204 are concentric, it should be appreciated that the yoke drive shaft 202 may pass through the crank drive shaft 204, or the crank drive shaft 204 may pass through the yoke drive shaft 202. Still other configurations may be used.

A payload may optionally be mounted on a component of the spherical mechanical linkage. In various embodiments, the payload is mounted on the rocking frame 108, such that the payload axis 6 and thus the payload itself may be pointed in a desired direction by rotating one or more of the linkage members about an axis. As discussed above, it should be appreciated that because the central area in the rocking frame 108 is relatively open, payloads such as parabolic mirrors, flat mirrors, solar cell panels, cameras, spotlights, radar antennas, telescopes, photodetectors, firearms, or any other suitable object can be easily mounted.

Basic multi-axis tracking systems, such as the embodiment of the multi-axis tracking system 200 shown in FIG. 4, may prompt many variations with many applications. Several of these variations and their applications are discussed below, though it should be appreciated that further variations are possible and that the described examples are not exhaustive. Components that are new in these variations will be illustrated by new reference numbers. Only new or modified components will be discussed in greater detail as they relate to each example variation.

Illustrative Variations: Solar Trackers

Various embodiments of multi-axis tracking systems may be used as solar trackers, such as heliostats and coelostats. These embodiments have many applications, such as residential and industrial illumination, spectacular light show displays, intense or concentrated lighting or illumination for solar power generation, and use as a scientific tool in the general field of solar experimentation. For solar power generation, "solar farms" may be constructed containing large arrays of heliostats. In solar tracker embodiments, an embodiment of a spherical mechanical linkage 100, such as that shown in FIG. 2, may be mounted and the yoke 102 and the crank 104 may be driven such that the payload axis 6 follows the position of the sun in the sky.

Figure 5:
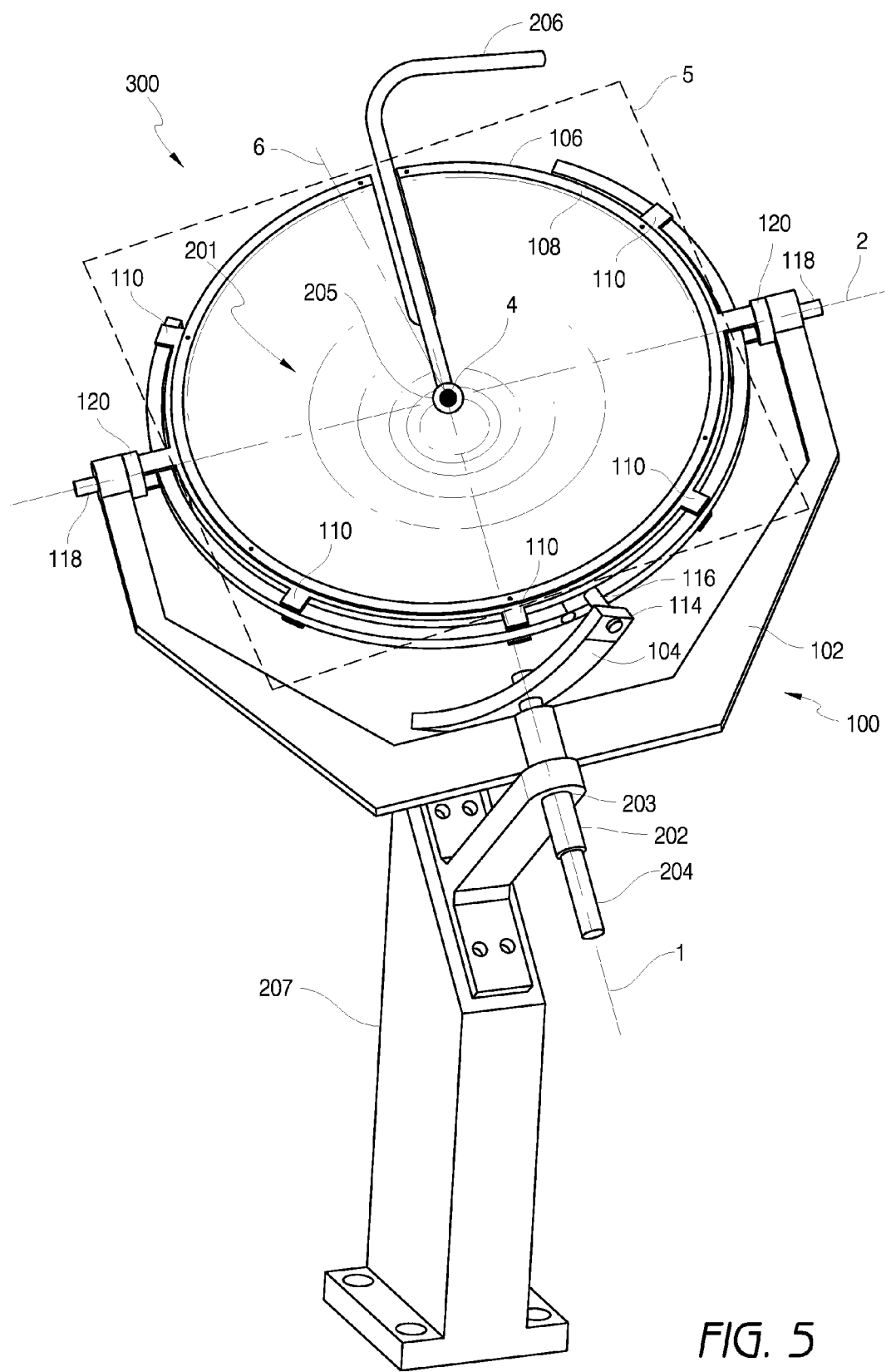
FIG. 5 depicts an environmental view of an embodiment of a multi-axis tracking system that incorporates a spherical mechanical linkage and a paraboloidal mirror that may be used as a heliostat.

FIG. 5 depicts an embodiment of a heliostat 300. The heliostat 300 includes an embodiment of a spherical mechanical linkage 100 mounted on a base 207. This particular embodiment of a spherical mechanical linkage 100 includes a yoke 102 including several linear sections, a symmetric crank 104, and a partially annular deflecting member 106 and rocking frame 108. The crank 104 may be coupled to the deflecting member 106 such that the third axis 3 intersects with the second axis 2 at an angle Δ substantially equal to a planet's angle of obliquity. A planet's angle of obliquity, also called axial tilt, is the angle a planet's axis of rotation makes with respect to a line perpendicular to its orbital plane, as determined by the right-hand rule. For example, Earth's angle of obliquity is currently approximately 23.45°. It should be appreciated that other variations on the components of the spherical mechanical linkage 100, discussed above with respect to FIG. 1, may be used with this heliostat 300 as well as with other heliostat embodiments.

As discussed above, the spherical mechanical linkage 100 may be mounted on the base 207 such that the first axis 1 is substantially parallel to a planet's axis of rotation. Accordingly, in this embodiment, the base 207 has been modified such that when the spherical mechanical linkage is mounted on the base 207, the first axis 1 is substantially parallel to the Earth's axis of rotation. Thus the crank 102 and the yoke 104 may be driven such that the payload axis 6 tracks the sun's position in the sky. The sun's position in the sky to an observer on a planet may vary based on the observer's location on the planet, the time of day, the time of year, the planet's axial tilt, and the equation of time anomaly.

One component of the sun's observed position in the sky is the solar hour angle, or right ascension. On Earth, for example, the sun's solar hour angle varies periodically with a period of approximately 24 hours, or one mean solar day. Accordingly, in one embodiment of the heliostat 300, the spherical mechanical linkage 100 is mounted on the base such that the first axis 1 is substantially parallel to a planet's axis of rotation. The movement of the yoke 102 may be used to account for this component of the sun's position in the sky. For example, the yoke 102 may be driven at a rate of about one revolution (360 degrees) about the first axis 1 per mean solar day, or about 365.2422 revolutions per year.

The sun's seasonal declination is another component of the sun's observed position in the sky. The sun's declination is the angle between the rays of the sun and the plane of a planet's equator. The sun's declination varies throughout the year. This variation is periodic and approximately sinusoidal. On Earth, the amplitude of this variation is about 23.45° and the period of this variation is about one sidereal year. The construction and movement of the crank 104 may be used to account for this component of the sun's position in the sky. For example, the angle Δ of the deflecting member shaft 116 with respect to the first axis 1 may be approximately 23.45°. The crank 104 may be driven at a rate of about one revolution (360 degrees) about the first axis 1 per mean sidereal day, or about 366.2422 revolutions per year.

Combining the rotation of the yoke 102 and the crank 104 provides one way to track both the hour angle and seasonal declination components of the sun's position in the sky. As the yoke 102 rotates about the first axis 1, it takes the crank 104, the deflecting member 106, and the rocking frame 108 with it. Thus, the payload axis 6 rotates about the first axis 1, following the sun as the sun's hour angle changes throughout the day. The crank 104 may be driven about the first axis 1 by a motor coupled to a crank drive shaft 204. As the crank 104 rotates about the first axis 1, it causes the deflecting member 106 and rocking frame 108 to oscillate about the second axis 2 by about ±23.45° at the rate of one cycle per year. Thus, the payload axis 6 oscillates about the second axis 2, following the sun as the sun's declination changes throughout the year.

Figure 6:
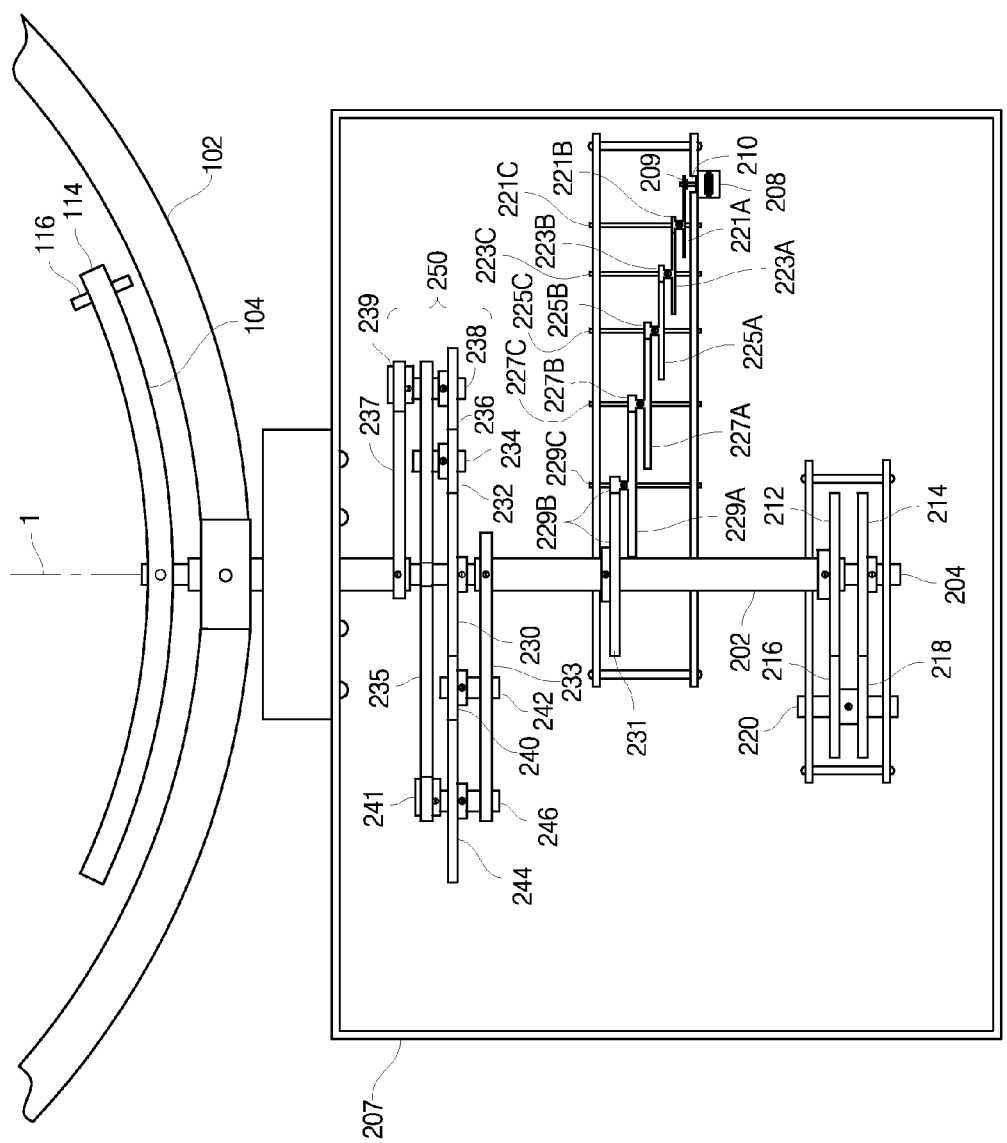
FIG. 6 depicts an isometric schematic view of a gearbox that may be incorporated in an embodiment of a multi-axis tracking system.

FIG. 6 depicts an embodiment of a gearbox that may be advantageously used with the heliostat 300 illustrated in FIG. 5 or with any other solar tracker embodiment. This gearbox includes three gear trains: one gear train for increasing torque, one gear train for revolving the yoke 102 and the crank 104 at their respective rates, and an equation-of-time correction mechanism 250 for advancing or retarding the motion of the yoke 102. In reference to the heliostat 300 illustrated in FIG. 5, this motor and gear train configuration may be housed inside the base 207. Preferably, the gear train for increasing torque and the gear train for revolving the yoke 102 and the crank 104 at their respective rates are both stabilized by providing caging for the gear trains. This caging, which may be affixed to or integral to the base 207, is not depicted so as not to obscure the principles of the present disclosure. The yoke drive shaft 202 and the crank drive shaft 204 may be arranged such that they are concentric about the first axis 1, and coupled to the base 207 through the base bearing 203.

A motor 208 drives a motor drive shaft 210 on which motor gear 209 is mounted. In one embodiment, the motor 208 is a stepper motor with a clock circuit and drives the motor gear 209 at a rate of approximately one revolution per second. Gear ratios may be chosen so that the output of motor 208 is geared down by a factor of about 86,400, the number of seconds in a mean solar day. Thus, the yoke shaft gear 231 (and the attached yoke drive shaft 202 and the first yoke gear 212) may be driven at a rate of about one revolution per mean solar day. Accordingly, the following gear ratios may be selected so that one revolution per second of the motor gear 209 produces one revolution per mean solar day of the yoke shaft gear 229B:

| Driving Gear | Driven Gear | Ratio | Output Shaft |
| --- | --- | --- | --- |
| 209 | 221A | 1:4 | 221C |
| 221B | 223A | 1:5 | 223C |
| 223B | 225A | 1:6 | 225C |
| 225B | 227A | 1:8 | 227C |
| 227B | 229A | 1:9 | 229A |
| 229B | 231 | 1:10 | 202 |

As the motor 208 is geared down by a factor of 86,400, the output torque on the yoke shaft 202 is increased by a factor of 86,400. An advantage afforded by the added torque is that a relatively low-torque motor 208 may be able to drive a heavy yoke drive shaft 202 and/or a yoke 102 with a heavy payload attached thereto.

The first yoke gear 212 may be affixed to yoke drive shaft 202 such that the first yoke gear 212 turns at the same rate as the yoke drive shaft 202. The first yoke gear 212, the second yoke gear 216, the second crank gear 218, and the first crank gear 214 may be selected such that when the yoke drive shaft 202 and first yoke gear 212 are driven at a rate of about one revolution per mean solar day, or about 365.2422 revolutions per year, the crank drive shaft 204 is driven at a rate of about one revolution per sidereal day, or 366.2422 revolutions per year. Thus, as the yoke shaft 202 and first yoke gear 212 rotate at a rate of once per mean solar day, gears may be selected so that the crank drive shaft 214 is driven at the slightly faster rate of:

$$\frac{366.2422}{365.2422} = 1,002,7373,909 \text{ rev/mean solar day} = 1 \text{ rev/sidereal day}.$$

An example of a gear configuration for driving the yoke drive shaft 202 at a rate of about one revolution per mean solar day and for driving the crank drive shaft 204 at a rate of about one revolution per sidereal day is as follows:

| Reference Number | # Gear Teeth |
| --- | --- |
| 212 | 79 |
| 214 | 82 |
| 216 | 49 |
| 218 | 51 |

This gear configuration comes very close to the exact ratio of revolutions per sidereal day to revolutions per mean solar day:

$$\frac{79 \cdot 51}{49 \cdot 82} = 1,002,797,680 \text{ rev/mean solar day}$$

The difference between the exact ratio and the ratio achieved by this example gear configuration is only 0.000,000,229 rev/day, or approximately 2 arc-minutes of error per year.

Other gear sets or types of motors may be employed as desired or required to vary the gear ratio. For example, a synchronous motor 208 turning motor gear 209 at one revolution per minute may be geared down by a factor of 1,440 (2×2×3×4×5×6)=1,440, the number of minutes in a mean solar day) so that yoke drive shaft 202 is driven at a rate of one revolution per mean solar day. In this embodiment, the torque on the yoke drive shaft 202 and the crank drive shaft 204 is increased by a factor of roughly 1,440. Those skilled in the art will appreciate that any configuration of gears and/or shafts may be employed as desired or required to increase or decrease torque, increase or decrease rotational velocity, or vary the gear ratio. Any number of idler gears may be added to gear configurations as well. One or more motors operating at the same or different speeds may also be used.

In addition to the solar hour angle and the seasonal declination, there is a third component of the sun's position in the sky called the "equation of time." Because of the eccentricity of Earth's orbit and Earth's axial tilt, the sun does not trace a path in the sky at a uniform rate, creating differences in clock time and sundial time. The equation-of-time anomaly is the difference between the local mean time (clock time) and the local apparent time (sundial time). The difference between local mean time and local apparent time may be modeled by the algebraic summation of two independent functions, each of which is approximately sinusoidal. The first is the eccentricity error, which for Earth has a magnitude of 1.918° and has one cycle per year. The second is the obliquity error, which for Earth has a magnitude of 2.47° and has two cycles per year. The two sinusoids are not in phase with one another:

the eccentricity sinusoid starts its cycle at aphelion, while the obliquity sinusoid starts its cycles at the vernal and autumnal equinoxes. Further information on the equation-of-time anomaly may be found in U.S. Pat. No. 4,368,962 to Hultberg, titled "SOLAR TRACKING APPARATUS AND SYSTEM," and issued on Jan. 18, 1983. The disclosure of this patent is hereby incorporated by reference in its entirety.

Thus, returning to FIG. 5 and FIG. 6, if the yoke 102 is driven at a uniform rate by the motor 208, the payload axis 6 may point slightly ahead of the sun's position in the sky or slightly behind the sun's position in the sky. Accordingly, solar tracker embodiments and other multi-axis tracker embodiments may include an equation-of-time correction mechanism coupled to the yoke 102 and/or the yoke drive shaft 202 so that the yoke 102 does not rotate about the first axis 1 at a uniform rate. An equation-of-time correction mechanism 250 may include means for advancing or retarding the rotation of the yoke 102 so that the yoke 102 and the segment of the yoke drive shaft 202 to which the yoke 102 is coupled rotate about the first axis 1 at a non-uniform rate of about one revolution per mean solar day.

Figure 7A:
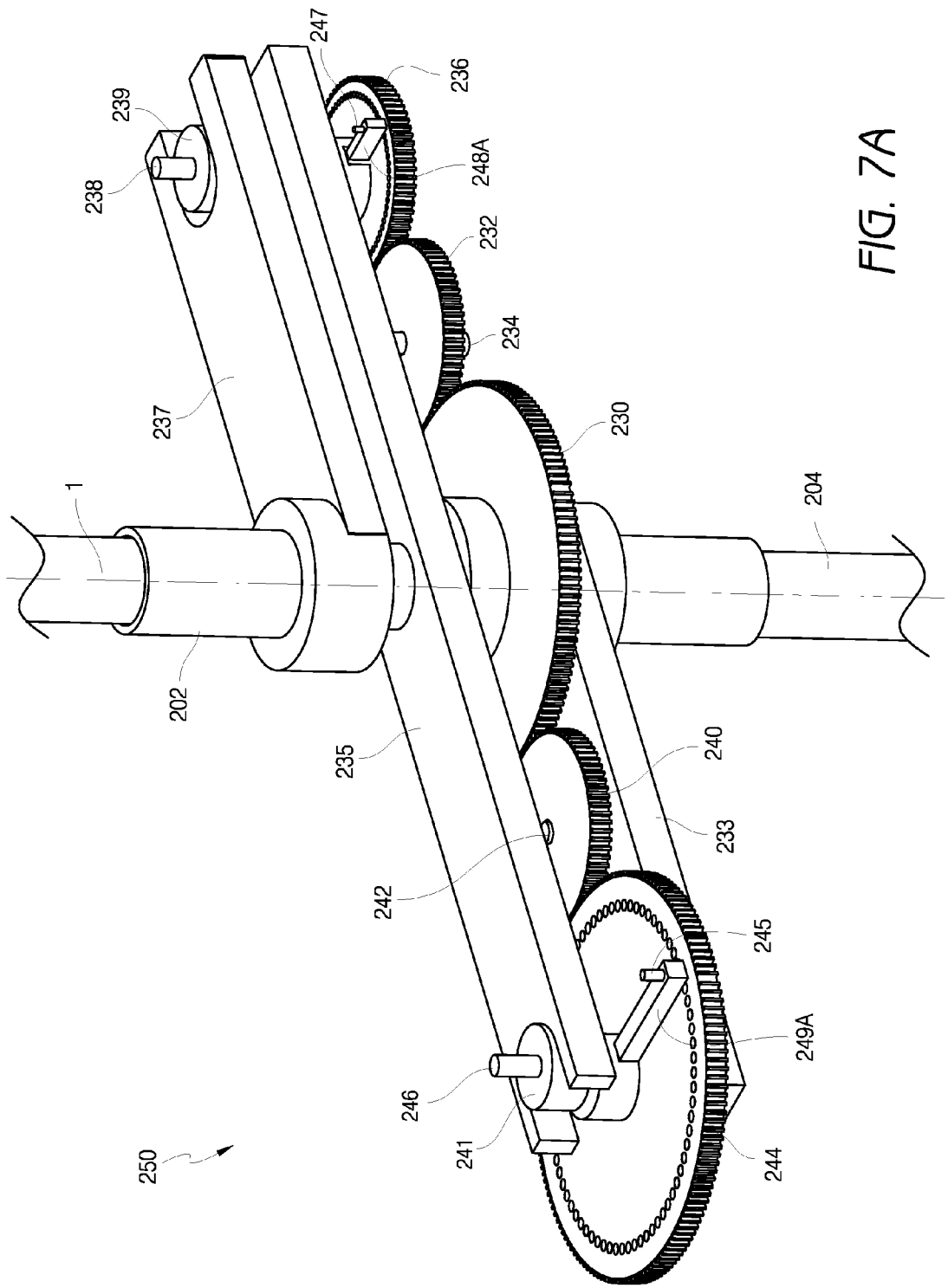
FIG. 7A depicts an isometric schematic view of an embodiment of an equation-of-time correction mechanism that may be incorporated in an embodiment of a multi-axis tracking system.

FIG. 7A shows one embodiment of an equation-of-time correction mechanism 250 that may be advantageously included with an embodiment of a solar tracker, such as the heliostat 300 illustrated in FIG. 5, to improve the accuracy of the solar tracker such that the payload axis 6 more accurately traces the observed position of the sun in the sky. Eccentrics may be coupled to the yoke drive shaft 202 in order to advance or retard the rotation of the yoke 102 about the first axis 1 to correct the eccentricity and obliquity errors described above. Though not shown, the gears of these and other equation-of-time correction mechanisms may be caged to stabilize the movement of the gears. This caging is not depicted, so as not to obscure the principles of the present disclosure.

The yoke drive shaft 202 is attached to a plate 233. A central gear 230 is mounted on the crank drive shaft 204 such that it rotates with the same angular velocity as the crank drive shaft 204. The central gear 230 drives an idler gear 240, which is rotatably coupled to the plate 233 by a shaft 242. The idler gear 240 drives an outer gear 244, which is rotatably coupled to the plate 233 by means of a shaft 246. The outer gear 244 may have the same number of teeth as the central gear 230. An eccentric cylinder 241 is connected to the outer gear 244 by means of a pin 245, such that the eccentric cylinder 241 rotates with the outer gear 244 only when the pin 245 engages the outer gear 244. The eccentric cylinder 241 includes a lower portion concentric with outer gear 244 and an upper portion that is offset from the center of the outer gear 244. The upper portion of the eccentric cylinder 241 engages the plate 235. In one embodiment, the center of the upper portion of the eccentric cylinder 241 is offset from the shaft 246 such that the rotation of the yoke drive shaft 202 is retarded or advanced by approximately ±1.918°, one cycle per year.

The central gear 230 also drives an idler gear 232, which rotates about a shaft 234 rotatably coupled to the plate 235. In some embodiments, the idler gear 232 is a relatively large gear, advantageously improving the accuracy of the equation-of-time correction mechanism 250. The idler gear 232 in turn drives an outer gear 236, which is rotatably coupled to the plate 235. A shaft 238 is rotatably coupled to the center of the outer gear 236. An eccentric cylinder 239 is connected to the outer gear 236 by means of a pin 247, such that the eccentric cylinder 239 rotates with the outer gear 236 only when the pin 247 engages the outer gear 236. The eccentric cylinder 239 includes a lower portion concentric with outer gear 236 and an upper portion that is offset from the center of the outer gear 236. The upper portion of the eccentric cylinder 239 engages the plate 237. In one embodiment, the center of the upper portion of the eccentric cylinder 239 is offset from the shaft 238 such that the rotation of the yoke drive shaft 202 is retarded or advanced by approximately ±2.47°, two cycles per year, with outer gear 236 having half the number of teeth as central gear 230.

The eccentric cylinder 239 and 241 may be selectively coupled and decoupled from the rest of the equation-of-time correction mechanism 250. A bar 248A may be connected to the eccentric cylinder 239, with a pin 247 passing therethrough and engaging one of the holes on outer gear 236. Likewise, a bar 249A may be connected to the eccentric cylinder 241, with a pin 247 passing therethrough and engaging one of the holes on outer gear 236. The pin 245 may be removed so as to decouple the eccentric cylinder 241 from the outer gear 244. Likewise, the pin 247 may be removed so as to decouple the eccentric cylinder 239 from the outer gear 236. When decoupled in this way, the outer gears 236 and 244 may be freely rotated so that the position of their respective eccentric cylinders 239 and 241 will line up with the cycles of the obliquity error and eccentricity error, respectively. The pins 245 and 247 may be replaced to recouple the eccentric cylinders 241 and 239, respectively, to the rest of the equation-of-time correction mechanism 250, such that the eccentric cylinders 241 and 239 rotate with outer gears 244 and 236, respectively.

Figure 7B:
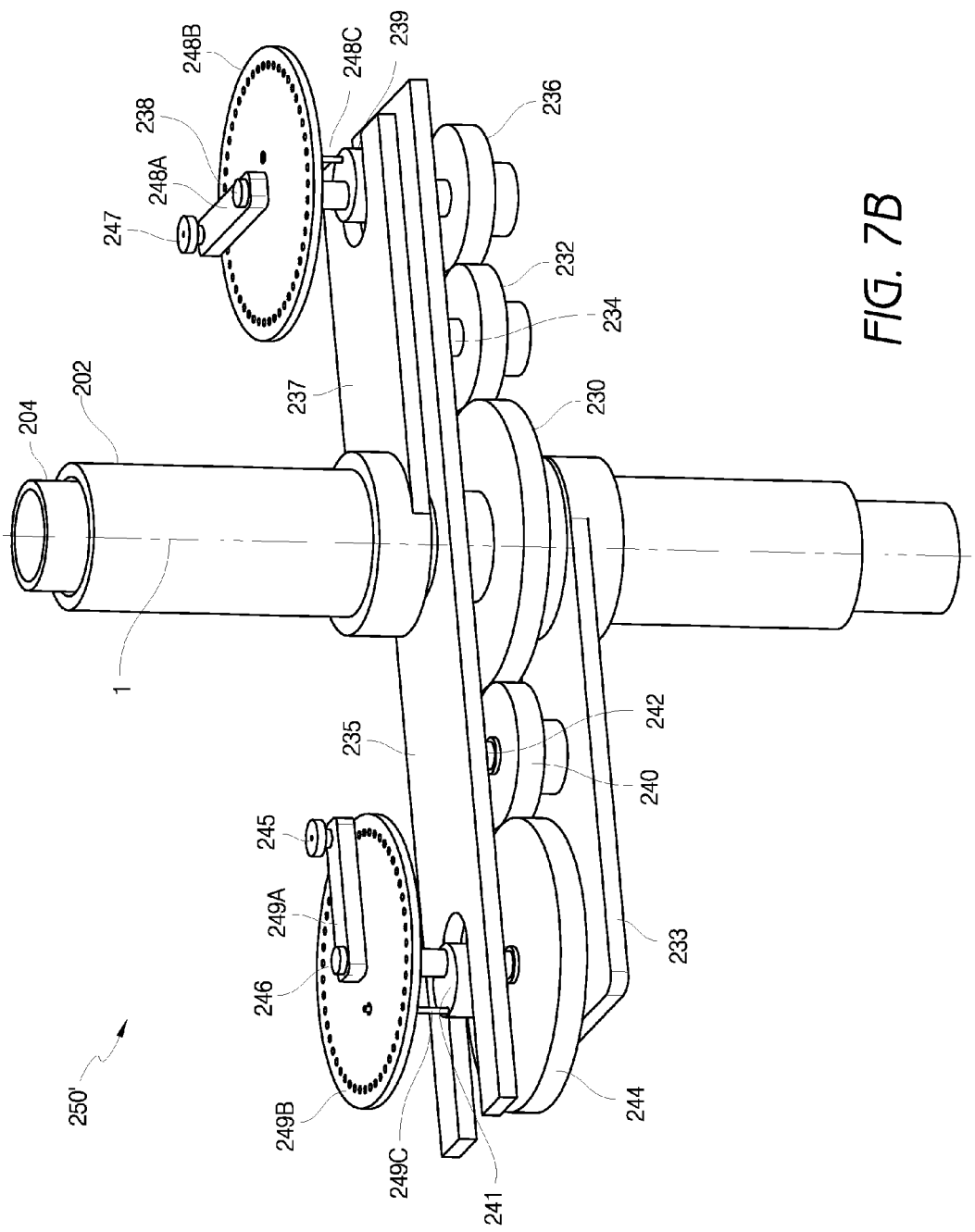
FIG. 7B depicts an isometric schematic view of an embodiment of an equation-of-time correction mechanism that may be incorporated in an embodiment of a multi-axis tracking system.

FIG. 7B depicts an embodiment of an equation-of-time correction mechanism 250'. The components of the equation-of-time correction mechanism 250' are largely similar to the components of the equation-of-time correction mechanism 250 in FIG. 7A, with like reference numbers assigned to like components.

In the equation-of-time correction mechanism 250', the eccentric cylinder 239 is connected by a screw 248C (or other equivalent structure) to a disk 248B. The disk 248B may include a number of circumferentially-arranged holes adapted to fit a pin 247. The bar 248A is attached to the shaft 238, and may also include a hole adapted to fit the pin 247. The disk 248B may be coupled to the bar 248A (and thus the shaft 238) by inserting the pin 247 through the hole in the bar 248A and a hole in the disk 248B. The pin 247 may also be removed to decouple the disk 248B from the bar 248A. If the disk 248B is decoupled from the bar 248A, it may be rotated freely to cause the eccentric cylinder 239 connected by the screw 248C to rotate as well. The disk 248B thus provides a convenient way to line up the eccentric cylinder 239 with the cycle of the obliquity error.

Another disk 249B may also be provided, connected by a screw 249C (or equivalent structure) to the eccentric cylinder 241. The disk 249B may include a number of circumferentially-arranged holes adapted to fit a pin 245. The bar 249A is attached to the shaft 246, and the bar 249A may also include a hole adapted to fit the pin 245. The disk 249B may be coupled to the bar 249A (and thus the shaft 246) by inserting the pin 245 through the hole in the bar 249A and a hole in the disk 249B. The pin 245 may also be removed to decouple the disk 249B from the bar 249A. If the disk 249B is decoupled from the bar 249A, it may be rotated freely to cause the eccentric cylinder 241 connected by the screw 249C to rotate as well. The disk 249B thus provides a convenient way to line up the eccentric cylinder 241 with the cycle of the eccentricity error.

It should be appreciated that in these embodiments of equation-of-time correction mechanisms 250 and 250', only the motion of the yoke drive shaft 202 (or a segment thereof) and the yoke 102 is modified. The motor 208 continues to drive the crank drive shaft 204 and the crank 104 at the uniform rate of one revolution per sidereal day. The advancement and retardation of the rotational motion of the yoke 102 may advantageously cause the payload axis 6 to track the sun's position in the sky with yet greater accuracy.

As discussed above, the heliostat 300 as shown in FIG. 5 (and other solar tracker embodiments) may be equipped with a gear train such as that shown in FIG. 6 and FIG. 7A or FIG. 7B. Thus, the payload axis 6 can very accurately track the movement of the sun through the sky by accounting for the three components of the sun's position in the sky described above. Returning again to FIG. 5, a paraboloidal mirror 201 may be mounted as a payload on the rocking frame 108 to take advantage of this accurate tracking for solar energy collection. The paraboloidal mirror 201 may have a focal point along the payload axis 6 that is identical to intersection point 4. The diameter of the paraboloidal mirror 201 may be substantially equal to four times its focal length, i.e. the distance along the payload axis 6 from the center of the paraboloidal mirror 201 to the intersection point 4. An energy receiver 205, such as a thermal receiver, photovoltaic element, or collection optics, may be positioned at the intersection point 4 in order to receive the solar energy reflected by the paraboloidal mirror 201. This configuration provides a very small image of the sun on the energy receiver 205, concentrating a high amount of solar energy on the energy receiver 205. It should be appreciated that a single energy receiver 205 can receive energy reflected by other sources, such as, for example, mirrors equipped on other heliostats. The energy receiver 205 may optionally be thermally coupled to a thermally conductive energy conduit 206 for converting or transmitting the collected solar energy. In some embodiments, the energy conduit is made of a solid material with a high melting point, such as tungsten.

In some embodiments, the energy conduit 206 is a thermally conductive conduit 206 to transmit thermal energy. The thermally conductive conduit 206 may include one or more heat pipes. The heat pipes may, for example, include a sealed length of tubing containing a heat transfer fluid. In some embodiments, the energy conduit 206 is made of a solid material with a high melting point, such as tungsten. The heat transfer fluid may be, for example, water or a molten salt. Thermal energy may be carried off through the thermally conductive conduit 206. The thermal energy may be transmitted through heat exchangers to drive turbines in order to rotate electric generators. In one embodiment, the generated electrical energy could be used to power an electric motor to drive the yoke 102 or the crank 104 about the first axis 1. Other applications for the collected thermal energy are possible. For example, the collected thermal energy may be used to melt metals, generate air conditioning by driving a Stirling engine compressor, provide space heating, or distill seawater, among other applications.

Figure 8:
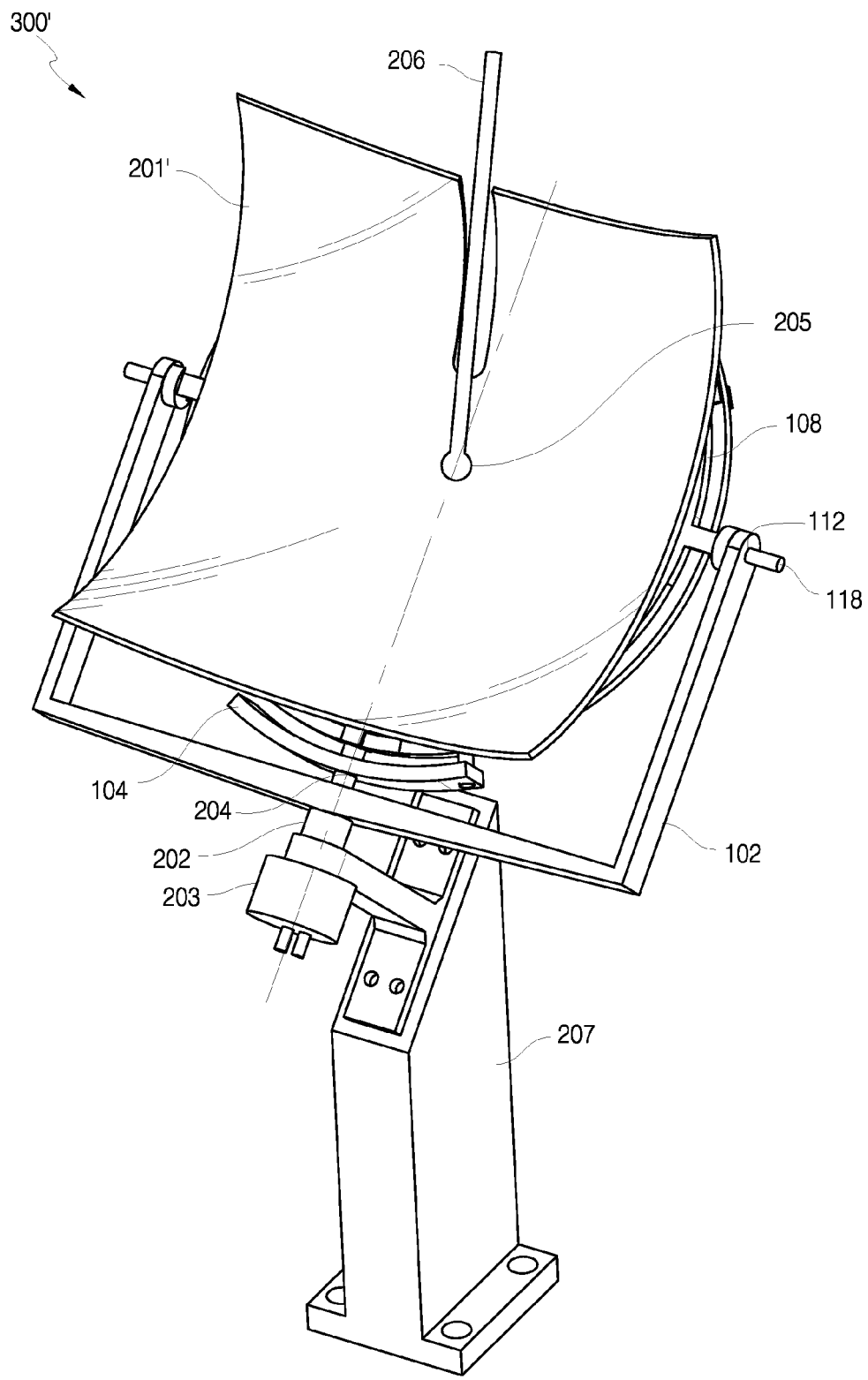
FIG. 8 depicts an environmental view of a multi-axis tracking system that incorporates a spherical mechanical linkage and a square paraboloidal mirror.

Many solar tracker variations are possible. For example, FIG. 8 depicts a heliostat 300'. Many of the components are similar to those in the heliostat 300 shown in FIG. 5. The heliostat 300' in FIG. 8 may include a similar gearbox with equation-of-time correction mechanism as shown in FIGS. 6 and 7. Unlike the heliostat 300 in FIG. 5, however, the heliostat 300' in FIG. 8 incorporates a square paraboloidal mirror 201'. A square paraboloidal mirror 201' may be advantageously used to increase the insolation area without increasing the diameter of the yoke 102 or the rocking frame 108. The square paraboloidal mirror 201' may also be advantageously employed as a way to center the mass of the moving components of the heliostat 300' with respect to the first axis 1.

Figure 9:
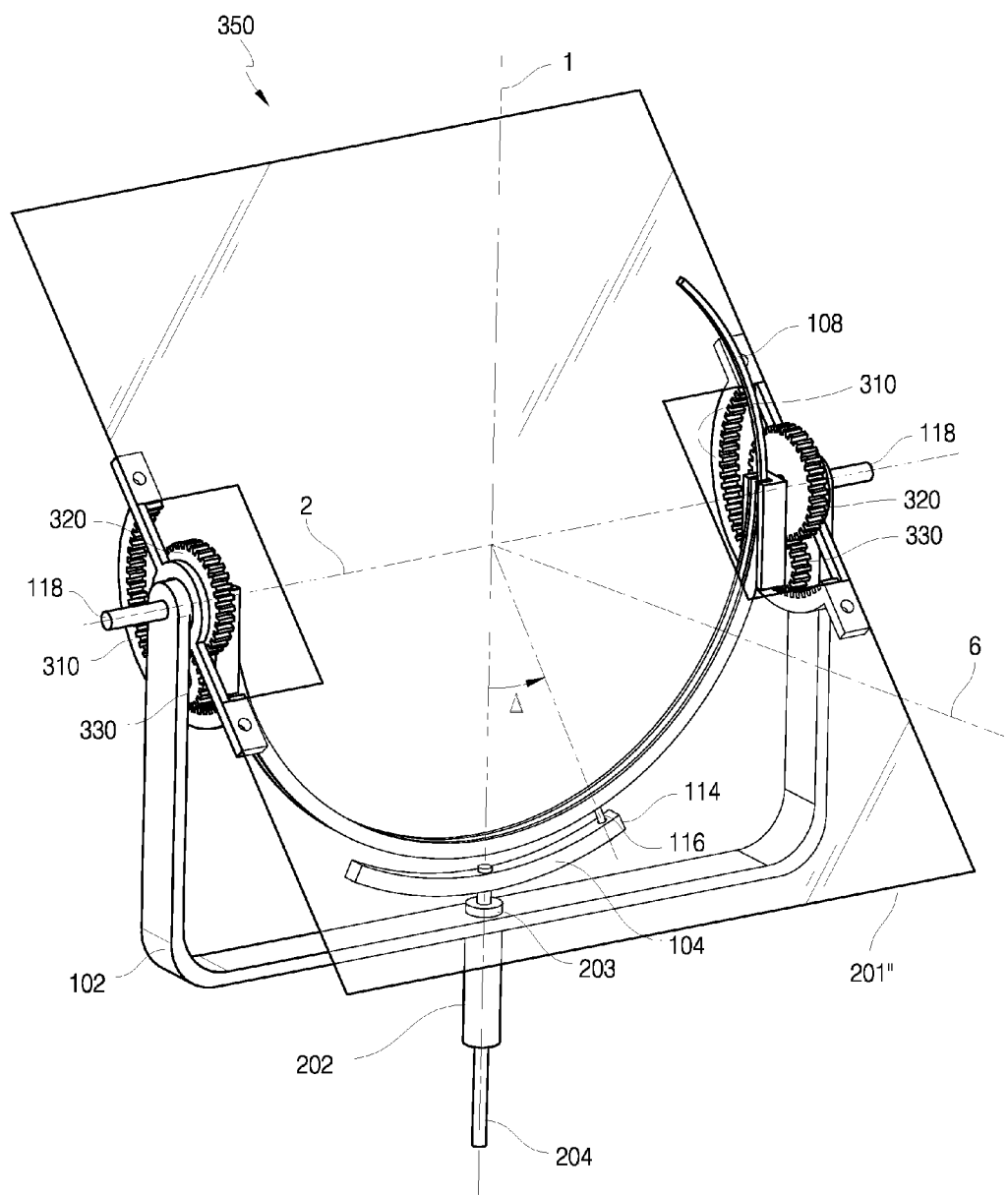
FIG. 9 depicts an environmental view of a multi-axis tracking system that incorporates a spherical mechanical linkage and a plane mirror.

Another solar tracker variation, a coelostat 350, is shown in FIG. 9. The coelostat 350 may include a similar gearbox with equation-of-time correction mechanism as shown in FIGS. 6 and 7. Central gears 320 may be rigidly attached to the yoke 102 so as not to rotate about the second axis 2. Idler gears 310 may be rotationally attached to the rocking frame 108, such that the idler gears 310 rock back and forth with the rocking frame around the central gears 320. The movement of the idler gears 310 causes the toothed mirror attachments 330 to rock back and forth as well. In one embodiment, the idler gears 310 have n teeth, the central gears 320 have 2n teeth, and the toothed mirror attachments 330 have 4n teeth. If the rocking frame 108 and idler gears 310 rock back and forth by ±23.45° once per year, the plane mirror 301 (depicted herein as partially transparent so as not to obscure the other parts of the coelostat 350) and the toothed mirror attachments 330 will rock back and forth by ±11.73° per year. Those skilled in the art will appreciate that this configuration causes the surface of the plane mirror 201" to bisect the angle between the payload axis 6 and the first axis 1, thus causing the sun's rays (incident along payload axis 6) to be reflected along the first axis 1 throughout the year.

Those skilled in the art will appreciate that the geometry of any mirror or other payload mounted on a solar tracker may be varied as desired in two or three dimensions. For example, the geometry of the mirror or other payload may be chosen so as to be compatible with an energy conduit, as shown in FIG. 5 and FIG. 8, or with components of the spherical mechanical linkage, as shown in FIG. 9. As shown in FIG. 5, FIG. 8, and FIG. 9, the mirrors mounted on the rocking frame 108 of each solar tracker may have notches. For example, in FIG. 5 and FIG. 8, the mirrors 201 and 201' have notches such that their rotational movement is not obstructed by the energy conduit 206. Likewise, in FIG. 9, the plane mirror 301 includes notches permitting the movement of the deflecting member 106 therethrough.

Illustrative Variation Boom-Mounted Multi-Axis Tracker

Figure 10:
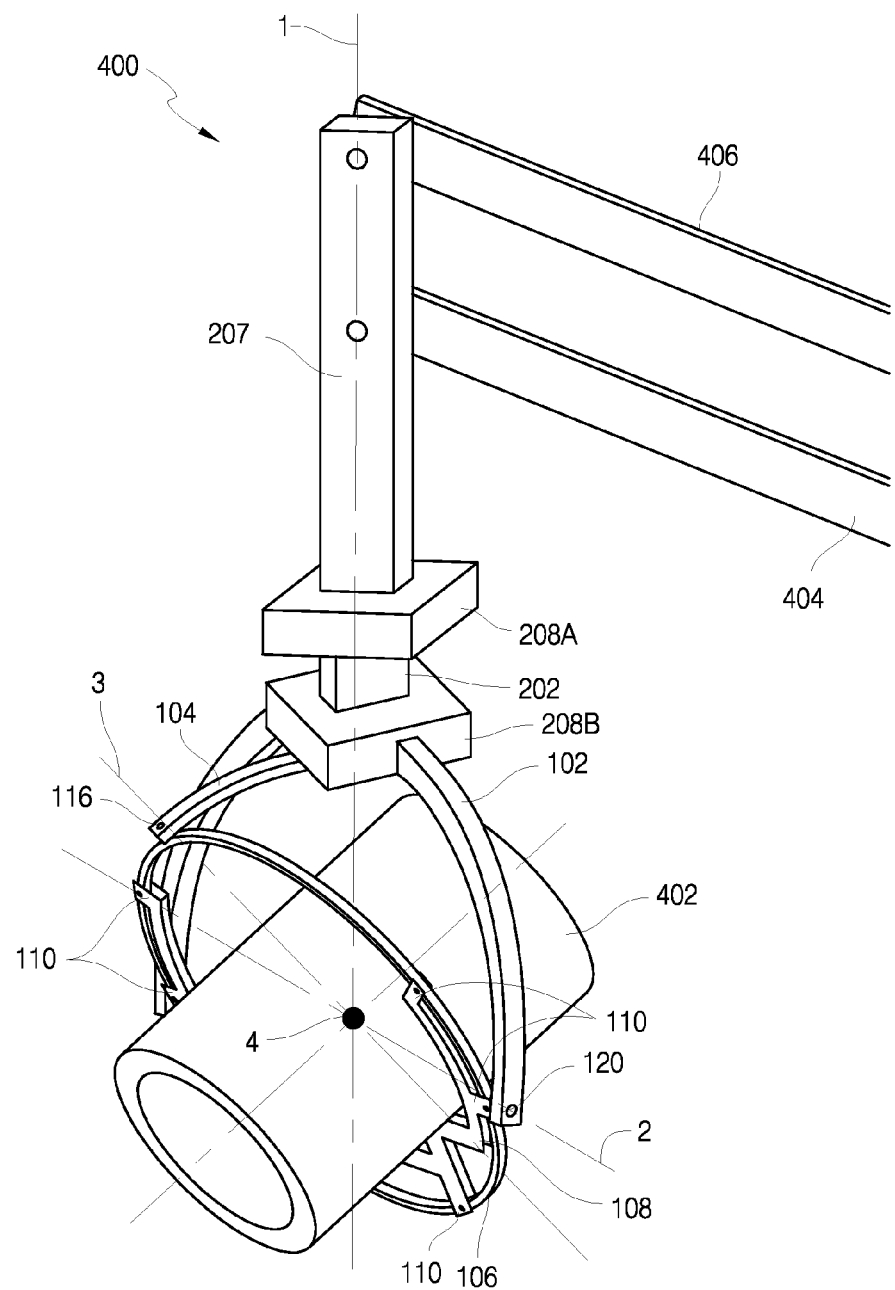
FIG. 10 depicts an environmental view of an embodiment of a multi-axis tracking system that incorporates a spherical mechanical linkage and is mounted on a boom.

FIG. 10 depicts an embodiment of a multi-axis tracker 400 wherein the base 207 is mounted on boom arms 404 and 406. In this embodiment, a payload 402, such as a still camera, video camera, or spotlight, may be coupled to the rocking frame 108. The shape of the rocking frame 108 may be chosen as desired to facilitate coupling with the payload 402. For example, the rocking frame 108 may include several straight portions along with several curved portions to facilitate mounting, for example, a cylindrical payload 402.

In this embodiment, the yoke motor 208A is mounted on the base 207 and is coupled to the yoke drive shaft 202. The crank motor 208B is connected to the yoke drive shaft 202, which is rotationally coupled to the yoke motor 208A. The crank motor 208B is connected directly to crank 104. The deflecting member 106 is coupled to the crank 104 by the stub shaft 116. The crank 104 is connected to the deflecting member 106 about the third axis 3 via a stub shaft 116 on the deflecting member 106. The deflecting member 106 is also slideably coupled to the rocking frame 108 through the bearing points 110.

As the yoke motor 208 drives the yoke drive shaft 202 about the first axis 1, the crank motor 208B and the yoke 102 turn with the yoke drive shaft 202 in a "panning" motion about the first axis 1. A "tilting" motion may be provided by the movement of the rocking frame 108 about the second axis 2. The rocking frame 108 may be turned by the movement of the deflecting member 106, which is coupled to the crank 104, which is driven by the crank motor 208B.

Illustrative Variation: Hollow Shaft

Figure 11:
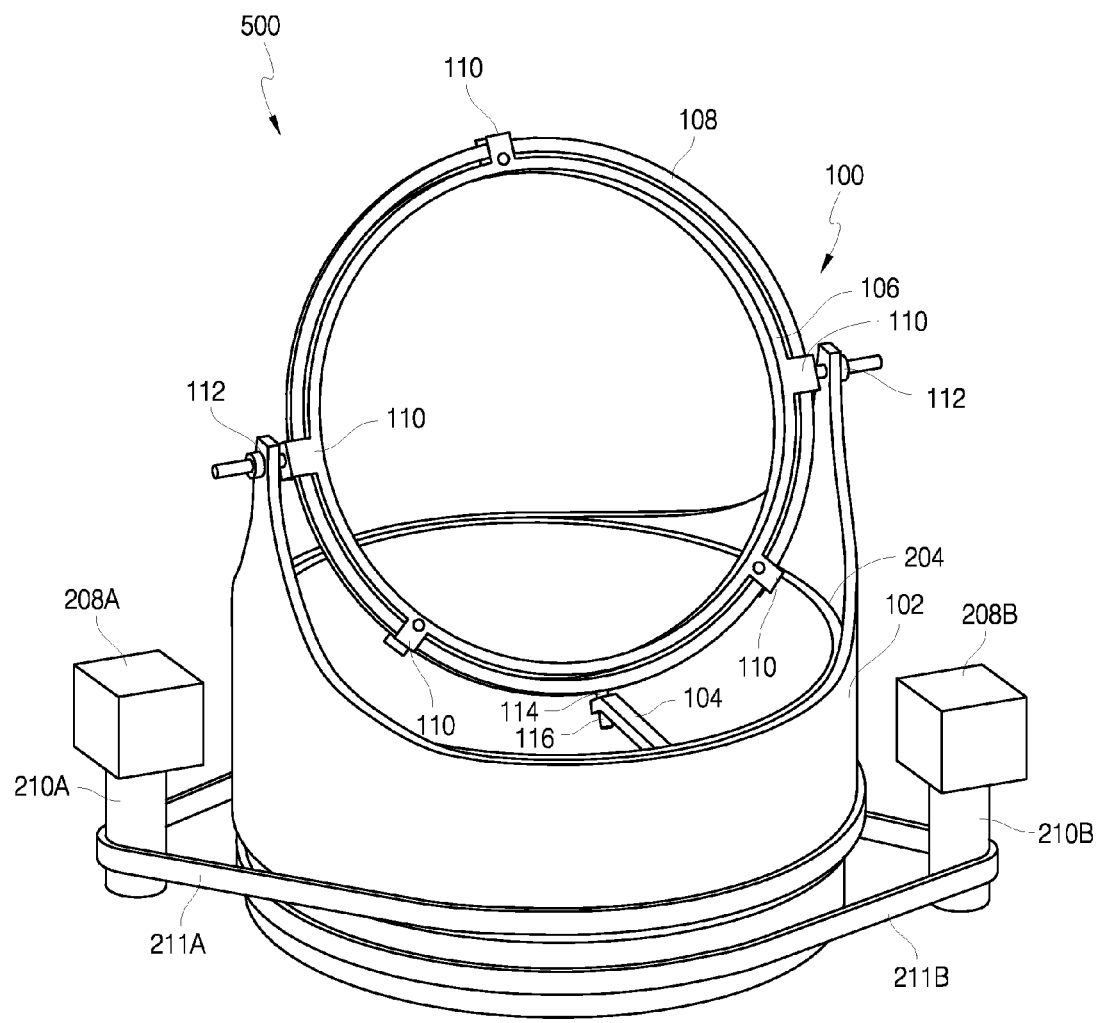
FIG. 11 depicts a cut-away of an embodiment of a multi-axis tracking system that incorporates a spherical mechanical linkage housed within a drive shaft.

FIG. 11 depicts an embodiment of a hollow shaft multi-axis tracking system 500 in which the yoke 102 and crank drive shaft 204 are hollow cylinders coupled to a crank 104. The yoke 102 and the crank drive shaft 204 have an inner diameter greater than the diameter of the deflecting member 106. The yoke 102 is driven by the motion of the yoke drive belt 211A coupled to the yoke motor 208A. The crank drive shaft 204 is driven by the motion of the crank drive belt 211B coupled to the crank motor 208B. As in other embodiments, the yoke 102 and the crank drive shaft 204 are free to rotate independently about the first axis 1, such that the crank 104 is free to rotate about the first axis 1 independently of the rotation of the yoke 102.

This embodiment has many uses. For example, this embodiment could be configured as a heliostat by providing motors and gears as discussed with reference to FIGS. 5 through 8. A mirror could be mounted on rocking frame 108 to deflect sunlight through the shaft and into, for example, the interior of a building. With an appropriate payload mounted on rocking frame 108, this embodiment could also be used in, for example, a camera obscura (with a mirror mounted on the rocking frame 108 and lenses to direct light onto a screen), a periscope (with a telescope mounted on the rocking frame 108), or a search light (with a light source mounted on the rocking frame 108). Those skilled in the art will recognize that an appropriately small hollow shaft multi-axis tracking system 500 may be mounted on the distal end of an endoscope and used to control a miniaturized camera or light source in small spaces, for example, inside of a human or animal patient.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the term "or" is used in its inclusive sense (and not in its exclusive sense) so that when used, for example, to connect a list of elements, the term "or" means one, some, or all of the elements in the list.

Although certain preferred embodiments and examples are disclosed herein, inventive subject matter extends beyond the specifically disclosed embodiments to other alternative embodiments and/or uses, and to modifications and equivalents thereof. Thus, the scope of the disclosure is not limited by any of the particular embodiments described herein. For example, in any method disclosed herein, the acts or operations of the method can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein. No single feature (or group of features) is necessary or indispensable for each embodiment. All modifications and variations are intended to be included herein within the scope of this disclosure and protected by the following claims.

What is claimed is:

1. A spherical mechanical linkage comprising:
   a yoke comprising an annular section and one or more yoke bearing points, the yoke defining a first intersecting axis and a second intersecting axis perpendicular to the first intersecting axis, the yoke bearing points being disposed on the yoke on the second intersecting axis;
   a crank comprising a crank bearing, the crank being rotatably coupled to the yoke about the first intersecting axis, the crank having a symmetry about the first axis;
   a deflecting member comprising an annular section and a stub shaft, the stub shaft being coupled to the crank bearing along a third intersecting axis, the deflecting member defining a rotating plane; and
   a rocking frame comprising an annular section slideably coupled to the deflecting member in the rotating plane and rotatably coupled to the yoke at the yoke bearing points;
   wherein the first intersecting axis, the second intersecting axis, and the third intersecting axis intersect at an intersection point in the rotating plane; and
   wherein the intersection point and the rotating plane define a payload axis normal to the rotating plane and passing through the intersection point.

2. The spherical mechanical linkage of claim 1, wherein the third intersecting axis of rotation intersects with the first intersecting axis at an angle substantially equal to a planet's angle of obliquity.

3. A multi-axis tracking system comprising:
   a base;
   a spherical mechanical linkage mounted on the base, the spherical mechanical linkage comprising:
      a yoke comprising an annular section, the yoke defining a first intersecting axis and a second intersecting axis perpendicular to the first intersecting axis;
      a crank rotatably coupled to the yoke about the first intersecting axis, the crank having a symmetry with respect to the first intersecting axis;
      a deflecting member comprising an annular section coupled to the crank along a third intersecting axis, the deflecting member defining a rotating plane; and
      a rocking frame comprising an annular section slideably coupled to the deflecting member in the rotating plane and rotatably coupled to the yoke about the second intersecting axis;
      wherein the first intersecting axis, the second intersecting axis, and the third intersecting axis intersect at an intersection point in the rotating plane; and
      wherein the intersection point and the rotating plane define a payload axis normal to the rotating plane and passing through the intersection point;
   a yoke driver configured to drive the yoke about the first intersecting axis; and
   a crank driver configured to drive the crank about the first intersecting axis.

4. The multi-axis tracking system of claim 3 further comprising a payload mounted on the rocking frame.

5. The multi-axis tracking system of claim 3, wherein the first intersecting axis is substantially parallel to a planet's axis of rotation.

6. The multi-axis tracking system of claim 5, wherein the third intersecting axis intersects with the first intersecting axis at an angle substantially equal to the planet's angle of obliquity.

7. The multi-axis tracking system of claim 6, wherein:
the yoke driver drives the yoke about the first intersecting axis at a rate of about 360 degrees per mean solar day; and
the crank driver drives the crank about the first intersecting axis at a rate of about 360 degrees per sidereal day.

8. The multi-axis tracking system of claim 7 further comprising an equation-of-time correction mechanism coupled to the yoke driver.

9. The multi-axis tracking system of claim 8, wherein the payload comprises a mirror.

10. The multi-axis tracking system of claim 9, wherein the mirror comprises a substantially paraboloidal portion.

11. The multi-axis tracking system of claim 10, wherein the substantially paraboloidal portion of the mirror defines a focal point along the payload axis.

12. The multi-axis tracking system of claim 11 further comprising an energy receiver disposed at the focal point.

13. The multi-axis tracking system of claim 12 further comprising an energy conduit configured to transmit energy received by the energy receiver.

14. The multi-axis tracking system of claim 11, wherein the focal point and the intersection point are identical.

15. The multi-axis tracking system of claim 9, wherein the mirror comprises a substantially planar portion.

16. A spherical mechanical linkage comprising:
a yoke defining a first axis and a second axis;
a crank rotatably coupled to the yoke about the first axis;
a rocking frame rotatably coupled to the yoke about the second axis, the rocking frame defining a plane;
a deflecting member slideably coupled at one or more bearing points to the rocking frame along a third axis, the deflecting member constrained to lie within the plane; and
a stub shaft coupled to the deflecting member and rotatably coupled to the crank along a fourth axis.

17. The spherical mechanical linkage of claim 16, wherein the yoke comprises an annular section.

18. The spherical mechanical linkage of claim 16, wherein the crank is substantially symmetric about the first axis.

19. The spherical mechanical linkage of claim 16, wherein the third axis intersects with the first axis at an angle substantially equal to a planet's angle of obliquity.

20. The spherical mechanical linkage of claim 16, wherein the deflecting member comprises an annular section.

21. The spherical mechanical linkage of claim 16, wherein the rocking frame comprises an annular section.

* * * * *